Sept. 17, 1963 L. B. REYNOLDS 3,103,686
WINDSHIELD WIPER AND APPLICATOR BLADE
Filed Sept. 27, 1961
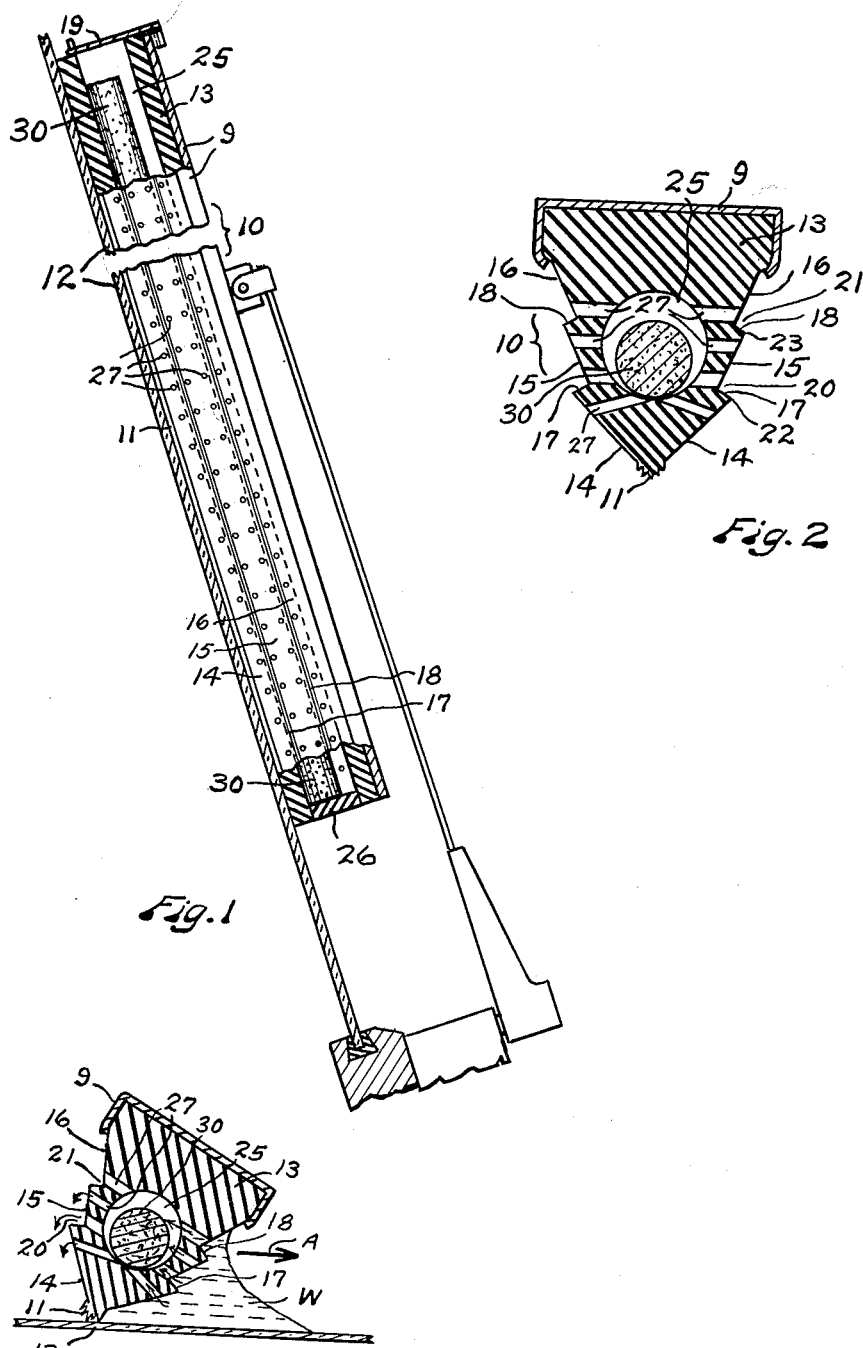
INVENTOR.
Loyal B. Reynolds
BY
Fred C. Matheny
ATTORNEY United States Patent Office 3,103,686
Patented Sept. 17, 1963

3,103,686
WINDSHIELD WIPER AND APPLICATOR BLADE
Loyal B. Reynolds, 255 SW. 171st St., Seattle 66, Wash.
Filed Sept. 27, 1961, Ser. No. 141,154
4 Claims. (Cl. 15—250.03)

My invention relates to a windshield wiper of a type used on motor vehicles.

Motor vehicle windshields collect oil-laden road dust which is not readily removed by a wiper blade when only water is present on the windshield. This is particularly true when the operation of a windshield wiper blade over a dirty windshield is first started. When water is present on a dirty windshield and a wiper blade begins to operate over the same oil will be picked up by the edge of the blade which contacts the windshield and spread on the windshield in the form of a film, which impairs the vision of the driver. This oil film is on both the wiper blade and the windshield and it is not readily removed by the use of water alone. My invention provides for applying de-greasing material to both the wiper blade and the windshield and this facilitates the quick and easy removal of oil from the windshield and makes driving easier and safer.

A general object of my invention is to provide a windshield wiper blade which is capable of carrying de-greasing material in solid form and is further capable of making a proper amount of this de-greasing material available and applying it to the exterior of the blade and to the part of the windshield over which the blade moves when water is present on the windshield and the blade is in operation so that grease and like solid matter on the windshield and on the wiper blade will be softened up and at least partially dissolved to such an extent that the moving blade will quickly remove the oil film from the windshield and will keep the windshield clean.

Another object of my invention is to provide a windshield wiper having a blade of simple and inexpensive construction which is free of moving parts but is capable of carrying de-greasing material in solid form and further capable of releasing a proper amount of said de-greasing material for cleaning purposes when the wiper blade is being operated over a wet windshield.

A further object is to provide a windshield wiper having a blade of elastic material of generally triangular cross section within which is a longitudinally extending internal receptacle or cavity capable of receiving a stick or fairly long piece of degreasing material, said blade further having transverse perforations extending through its side walls from the exterior of the blade to the cavity which contains the de-greasing material, whereby water may enter and leave said cavity and in so doing dissolve de-greasing material and carry the same out onto the wiper blade and the windshield.

Other objects of my invention will be apparent from the following description taken in connection with the accompanying drawings.

In the drawings

FIGURE 1 is a view partly inside elevation and partly in longitudinal section and with parts broken away showing a windshield wiper constructed in accordance with my invention, the same being in contact with a windshield, shown in section.

FIG. 2 is a cross sectional view of my windshield wiper blade on a larger scale than FIG. 1.

FIG. 3 is a cross sectional view on a smaller scale than FIG. 2 illustrating the operation of my windshield wiper blade.

Like reference numerals refer to like parts throughout the several views.

In accordance with my invention my windshield wiper blade is preferably formed of a molded or extruded strip 10 of rubber, neoprene or like elastic material of generally triangular cross sectional shape having a narrow inner edge portion 11, which is preferably longitudinally corrugated or serrated, and is adapted to contact and wipe over a windshield 12. Said blade 10 has a relatively wide outer edge portion 13. Two symmetrically arranged inclined side walls extend in divergent relation to each other between the narrow inner edge portion 11 and the wider outer edge portion 13. Considered from the inner edge portion 11 outwardly, each side wall comprises three flat wall sections 14, 15 and 16. The outer edge of each wall section 14 is connected by an abruptly offset narrow shoulder or ledge 17 with the inner edge of the adjacent wall section 15. The outer edge of each wall section 15 is connected by an abruptly offset narrow shoulder or ledge 18 with the inner edge of the adjacent wall section 16. Two longitudinally extending grooves 20 and 21 are formed in each side wall of the wiper blade 10 at the locations where the innermost edges of the narrow shoulders or ledges 17 and 18 intersect the respective walls 15 and 16. Two sharp or abrupt corners 22 and 23 are formed at the locations where the outer edges of the walls 14 and 15 intersect the outer edges of the abrupt shoulders 17 and 18. A longitudinally extending cavity 25 to receive a stick 30 of de-greasing material is provided within the wiper blade 10. A stick 30 formed chiefly of aluminum sulphate may be used. The cavity 25 does not extend entirely to the lowermost end of the wiper blade 10 but the lower end of said cavity 25 is closed or substantially closed by a member 26, which may be integral with the blade or may be in the form of an insert or plug. Preferably the upper end of the cavity or receptacle 25 is closed by a readily movable cap or cover member 19 which is supported from the frame member 9 by which the blade 10 is carried. The cover member 19 can be readily moved to uncover the cavity 25 and allow the stick 30 of de-greasing material to be placed therein. Thus the blade 10 is easily re-charged with degreasing material if the supply therein becomes exhausted.

A plurality of small transverse water passageways 27 extend between the outer surface of each side wall of the blade and the cavity 25. Preferably the passageways 27 are arranged in rows with the passageways of two rows on each side terminating at their outermost ends of the grooves or troughs 20 and 21 at the base of the ledges 17 and 18 and the perforations of two other rows terminating in the respective flat wall sections 14 and 15.

Because the wiper blade 10 is loosely held in a conventional manner by the devices which hold and operate it the drag of the inner edge of said blade 10 on the windshield will always cause it to lean or incline, from its inner edge outwardly, in the direction in which it is moving. FIG. 3 shows the wiper blade 10 in an inclined position it may assume when moving from left to right in the direction indicated by arrow A, it being understood that the blade will lean in the other direction when moving from right to left. When there is no moisture on the windshield none of the degreasing material will be dissolved. If at any time when the windshield wiper is operating there is a substantial amount of water on the windshield, due to atmospheric moisture or due to the wetting of the windshield with a windshield washer, water will tend to pile up against the side of the blade toward which said blade is moving, as indicated by W in FIG. 3, and some of this water will enter the cavity 25 by way of the passageways 27 and after washing over the degreasing stick 30 will find its way out of the cavity 25, usually by way of passageways 27 on the opposite side of the blade from which it entered. The water which thus washes through the cavity 25 and back onto the windshield will carry with it sufficient degreasing material to cut or dissolve the grease film on the inner edge of the blade and on the windshield so that this film is easily removed by the wiper blade. When water piles up against the outside wall of an inclined wiper blade 20 the ledges 17 and 18 will help direct this water into the channels 20 and 21 and some of this water will be constantly washing through the cavity 25 and picking up de-greasing material.

Preferably the detergent stick 30 is long enough so that it extends substantially from end to end of the wiper blade 10, thus insuring that some de-greasing material will be applied throughout the length of the blade. However, if the center of movement of a blade is below said blade a short stick of de-greasing material will be caused to move up and down in the cavity 25 by the combined action of gravity and centrifugal force resulting in a good distribution of de-greasing material over the area covered by the blade. I find that some de-greasing material will always adhere to and remain on the blade 10 in a dry state and, if operation of the blade is started when there is a little moisture on the windshield but not enough to wash through the cavity 25, this adhered de-greasing material on the blade will be sufficient to insure good cleaning of the windshield.

The foregoing description and accompanying drawings clearly disclose a preferred embodiment of my invention but it will be understood that this disclosure is merely illustrative and that changes may be made within the scope of the following claims.

I claim:

1. In a windshield wiper and applicator for dissolving water soluble material from a stick of said material and applying the dissolved material to a windshield, a blade of elastic material of generally triangular cross sectional shape having a narrow inner edge portion adapted to be placed in contact with and to be moved over the surface of a windshield, said blade having a longitudinally extending cavity forming therein a receptacle for a stick of water soluble material; and transverse perforations in the side walls of said blade intersecting said cavity providing for the circulation of water present on the surface of a windshield from one side to the other of said blade into and out of said cavity.

2. A windshield wiper and applicator for dissolving water soluble material from a stick of said material and applying the dissolved material to a windshield, comprising a blade of elastic material of generally triangular cross section having a narrow windshield engaging inner edge portion and an oppositely positioned wide outer edge portion and having two side walls which extend divergently from said narrow inner edge portion to said wider outer edge portion, said blade having within it a longitudinally extending cavity forming a receptacle for a stick of water soluble material; and a plurality of transverse perforations extending directly between the outer surfaces of said divergent side walls and said cavity, said perforations and cavity forming transverse passageways through said blade through which liquid present on a windshield can flow from one side to the other of said blade through said cavity.

3. The apparatus as claimed in claim 2 in which the divergent side walls are provided with alternate longitudinally extending troughs and ridges and in which at least a substantial number of the perforations terminate at their outer ends in the bottoms of said troughs.

4. The apparatus as claimed in claim 2 in which the cavity extends substantially from end to end of the blade and a stick of water soluble material of a length substantially equal to the length of the cavity is disposed within said cavity.

References Cited in the file of this patent

UNITED STATES PATENTS

| | | |
|---|---|---|
| 2,319,904 | Oshei et al. | May 25, 1943 |
| 2,535,805 | McIntyre et al. | Dec. 26, 1950 |
| 2,582,717 | Pierce | Jan. 15, 1952 |